(12) United States Patent
Fukushige et al.

(10) Patent No.: US 10,146,211 B2
(45) Date of Patent: Dec. 4, 2018

(54) VARIABLE MAGNETIZATION MACHINE CONTROLLER

(71) Applicants: Nissan Motor Co., Ltd., Yokohama-shi, Kanagawa (JP); Wisconsin Alumni Research Foundation, Madison, WI (US)

(72) Inventors: Takashi Fukushige, Kanagawa (JP); Chen-yen Yu, Cupertino, CA (US); Robert D. Lorenz, Madison, WI (US)

(73) Assignees: Nissan Motor Co., Ltd., Yokohama (JP); Wisconsin Alumni Research Foundation, Madison, WI (US)

( * ) Notice: Subject to any disclaimer, the term of this patent is extended or adjusted under 35 U.S.C. 154(b) by 345 days.

(21) Appl. No.: 14/911,270

(22) PCT Filed: Sep. 12, 2013

(86) PCT No.: PCT/US2013/059388
§ 371 (c)(1),
(2) Date: Feb. 10, 2016

(87) PCT Pub. No.: WO2015/038124
PCT Pub. Date: Mar. 19, 2015

(65) Prior Publication Data
US 2016/0187875 A1 Jun. 30, 2016

(51) Int. Cl.
*G11B 3/00* (2006.01)
*G05B 19/4155* (2006.01)
(Continued)

(52) U.S. Cl.
CPC ........ *G05B 19/4155* (2013.01); *B60L 15/007* (2013.01); *B60L 15/025* (2013.01);
(Continued)

(58) Field of Classification Search
None
See application file for complete search history.

(56) References Cited

U.S. PATENT DOCUMENTS 8,811,047 B2 * 8/2014 Rodriguez .......... H02M 7/4807
363/35
2010/0201294 A1 8/2010 Yuuki et al.
(Continued)

FOREIGN PATENT DOCUMENTS

CN 102624314 A 8/2012

OTHER PUBLICATIONS

Uwe Baader et al., Direct Self Control (DSC) of Inverter-Fed Induction Machine: A Basis for Speed Control Without Speed Measurement, IEEE Transactions on Industry Applications, May 1, 1992, p. 581-588, vol. 28, No. 3, IEEE, New York, US.

*Primary Examiner* — Harry W Byrne
*Assistant Examiner* — Sultana Begum
(74) *Attorney, Agent, or Firm* — Global IP Counselors, LLP

(57) ABSTRACT

A variable magnetization machine controller including a hysteresis control component configured to receive an ideal magnetization state signal, output an actual magnetization signal based on the ideal magnetization state signal for control of a variable magnetization machine, and modify the actual magnetization state signal in accordance with an error value between the ideal magnetization state signal and the actual magnetization state signal.

19 Claims, 16 Drawing Sheets

(51) Int. Cl.
*B60L 15/02* (2006.01)
*B60L 15/00* (2006.01)
*H02P 21/00* (2016.01)
*H02P 21/12* (2016.01)
*H02P 25/00* (2006.01)
*H02P 25/08* (2016.01)

(52) U.S. Cl.
CPC .......... *H02P 21/0089* (2013.01); *H02P 21/12* (2013.01); *H02P 25/00* (2013.01); *H02P 25/08* (2013.01); *G05B 2219/35411* (2013.01); *Y02T 10/643* (2013.01)

(56) References Cited

U.S. PATENT DOCUMENTS

| | | |
|---|---|---|
| 2011/0221433 A1 | 9/2011 | Ohta et al. |
| 2012/0181970 A1 | 7/2012 | Yuuki et al. |
| 2012/0242288 A1 | 9/2012 | Birke et al. |
| 2013/0184912 A1 | 7/2013 | Sujan et al. |

\* cited by examiner

VARIABLE MAGNETIZATION MACHINE CONTROLLER

CROSS-REFERENCE TO RELATED APPLICATION

This application is a U.S. National stage application of International Application No. PCT/US2013/059388, filed Sep. 12, 2013 the contents of which are herein incorporated by reference Related subject matter is disclosed in International Application No. PCT/US2013/048562, filed on Jun. 28, 2013, and in an International Application No. PCT/US2013/059393, filed on Sep. 12, 2013, the entire contents of International Application No. PCT/US2013/048562 and International Application No. PCT/US2013/059393, being incorporated by reference herein.

BACKGROUND

Field of the Invention

The present invention generally relates to a variable magnetization machine controller. More particularly, the present invention relates to a controller that includes a hysteresis component for changing the magnetization level of a variable magnetization machine, such as an electric motor or other type of variable flux machine, that is employed in an electric or hybrid electric vehicle.

Background Information

Electric vehicles and hybrid electric vehicles (HEV) include an electric motor that operates as a drive source for the vehicle. In a purely electric vehicle, the electric motor operates as the sole drive source. On the other hand, an HEV includes an electric motor and a conventional combustion engine that operate as the drive sources for the vehicle based on conditions as understood in the art.

Electric vehicles and HEVs can employ an electric motor having variable magnetization characteristics as understood in the art. For example, the magnetization level of the motor can be increased to increase the torque generated by the motor. Accordingly, when the driver attempts to accelerate the vehicle to, for example, pass another vehicle, the motor controller can change the magnetization level to increase the torque output of the motor and thus increase the vehicle speed.

Certain techniques exist for increasing the magnetization level of such an electric motor. In one conventional technique, a number of magnetization levels (e.g., 3 levels) can be predetermined based on the stator flux linkage. In another conventional technique, a number of magnetization levels (e.g., 5 levels) can be predetermined based on the magnetization state of the variable magnetization machine (e.g., the motor). However, if the ideal magnetization state (M/S) of the magnetization machine includes a high frequency component, the number of changes in the M/S will be large (e.g., 400 changes over a certain driving cycle) and the loss due to the number of changes will be significant. Alternatively, if the ideal M/S settles at a value between 2 nearest values, there will be some steady state error. Thus, the efficiency of the magnetization machine will not be maximized.

SUMMARY

Accordingly, it is desirable to provide an improved controller for a variable magnetization machine, such as a variable magnetization motor or other type of variable flux machine for a vehicle.

In view of the state of the known technology, one aspect of a variable magnetization machine controller according to the disclosed embodiments comprises a hysteresis control component configured to receive an ideal magnetization state signal, output an actual magnetization state signal based on the ideal magnetization state signal for control of a variable magnetization machine, and modify the actual magnetization state signal in accordance with an error value between the ideal magnetization state signal and the actual magnetization state signal.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
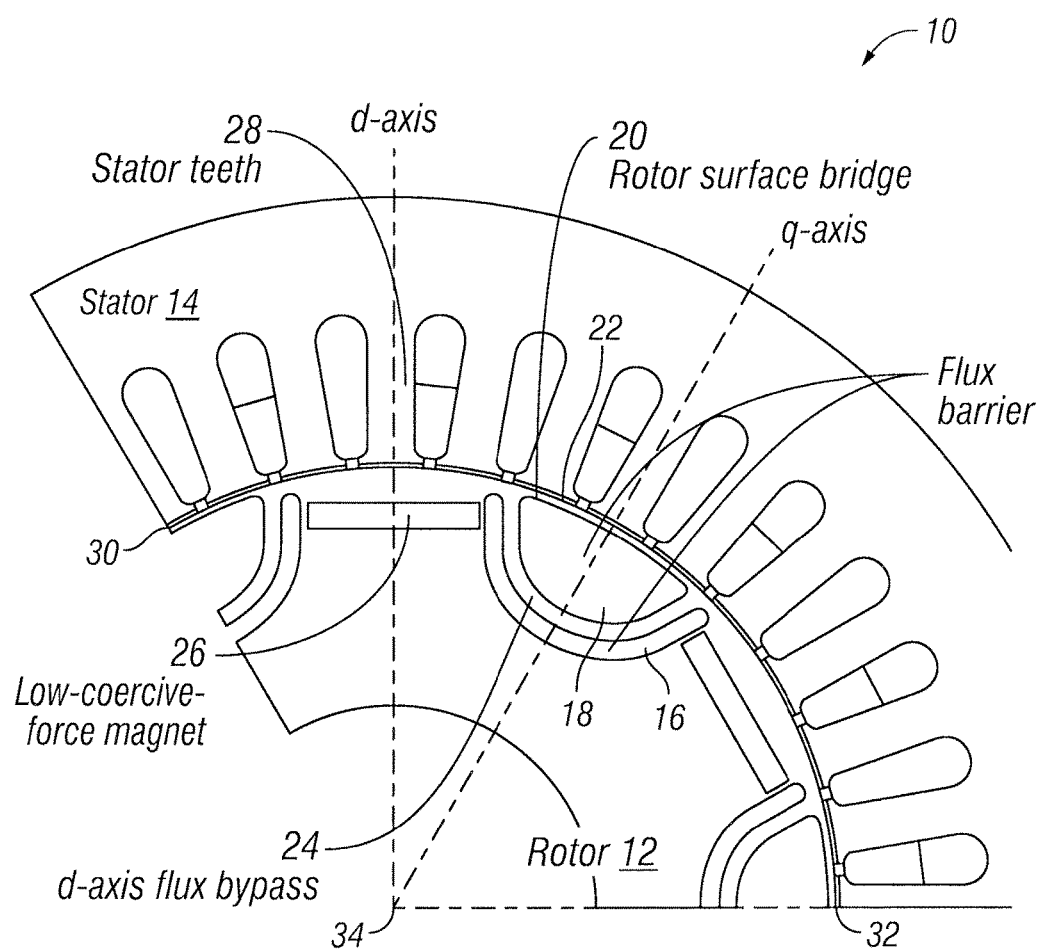
FIG. 1 is a partial cross-sectional schematic view of a variable magnetization machine according to a disclosed embodiment.

As shown in FIG. 1, a variable magnetization machine 10, which can also be referred to as a variable magnetization motor or other type of variable flux machine, includes a rotor 12 and a stator 14. As discussed herein, the terms variable magnetization machine and variable flux machine can be used synonymously to refer to the same type of machine. The variable magnetization machine 10 can be employed in any type of electric vehicle or HEV such as an automobile, truck, SUV and so on, and in any other type of apparatus as understood in the art. The rotor 12 and the stator 14 can be made of metal or any other suitable material as understood in the art.

In this example, the rotor 12 is configured to include a plurality of pairs of flux barriers 16 and 18, which can be configured as air gaps or can include any suitable type of insulating material as is conventional in the art. Although only one full pair and two partial pairs of the flux barriers 16 and 18 are shown, in this example, six pairs of flux barriers 16 and 18 can be spaced at 60 degree angles about the outer perimeter of the rotor 12. Naturally, the rotor 12 can include as many pairs of flux barriers 16 and 18 as deemed appropriate for the environment in which the variable magnetization machine 10 is employed. Also, as shown in this example, a q-axis of the motor passes through the center of a pair of flux barriers 16 and 18. However, the pairs of flux barriers 16 and 18 can be positioned at any suitable location with respect to the q-axis to achieve the operability of the embodiments discussed herein.

As further shown, a surface bridge 20 of the rotor 12 is present between the radially outward boundary of each flux barrier 18 and the outer circumference 22 of the rotor 12. Furthermore, a d-axis flux bypass 24 is present between each of the adjacent pairs of flux barriers 16 and 18. In this example, the surface bridges 20 and d-axis flux bypasses are made of the same material as the rotor 12. However, the surface bridges 20 and d-axis bypasses 24 can be made of any suitable type of material as known in the art.

In addition, a plurality of low-coercive-force magnets 26 are spaced between adjacent pairs of flux barriers 16 and 18 about the circumference of the rotor 12. As indicated, each of these magnets 26 extend longitudinally in a perpendicular or substantially perpendicular direction with respect to portions of adjacent flux barriers 16. However, the magnets 26 can be configured in any suitable size and shape. Also, in this example, the rotor 12 includes 6 magnets 26 which are positioned between the 6 pairs of flux barriers 16 and 18 and spaced at 60 degree intervals in a circumferential direction about the rotor 12. However, the number of magnets 26 can change with respect to a change in the number of pairs of flux barriers 16 and 18. Furthermore, each magnet 26 can be configured as a plurality of magnets. In this example, a d-axis passes through a center of a magnet 26. However, the magnets 26 can be positioned at any suitable location with respect to the d-axis to achieve the operability of the embodiments discussed herein.

The stator 14 includes a plurality of stator teeth 28 and other components such as windings (not shown) which can be configured in any conventional manner. In this example, the stator teeth 28 are configured as wide stator teeth as known in the art. However, the stator teeth 28 can have any suitable size, and the stator 14 can include any number of stator teeth 28 to achieve the operability of the embodiments discussed herein. In this example, the stator teeth 28 are open to the inner circumference 30 of the stator 14, but can be closed if desired. Also, an air gap 32 is present between the outer circumference 22 of the rotor 12 and the inner circumference 30 of the stator to enable the rotor 12 to rotate unrestrictedly or substantially unrestrictedly about an axis 34. In addition, the variable magnetization machine 10 can include features as described in International Application No. PCT/US2013/048562 and International Application No. PCT/US2013/059393, referenced above.

Figure 2:
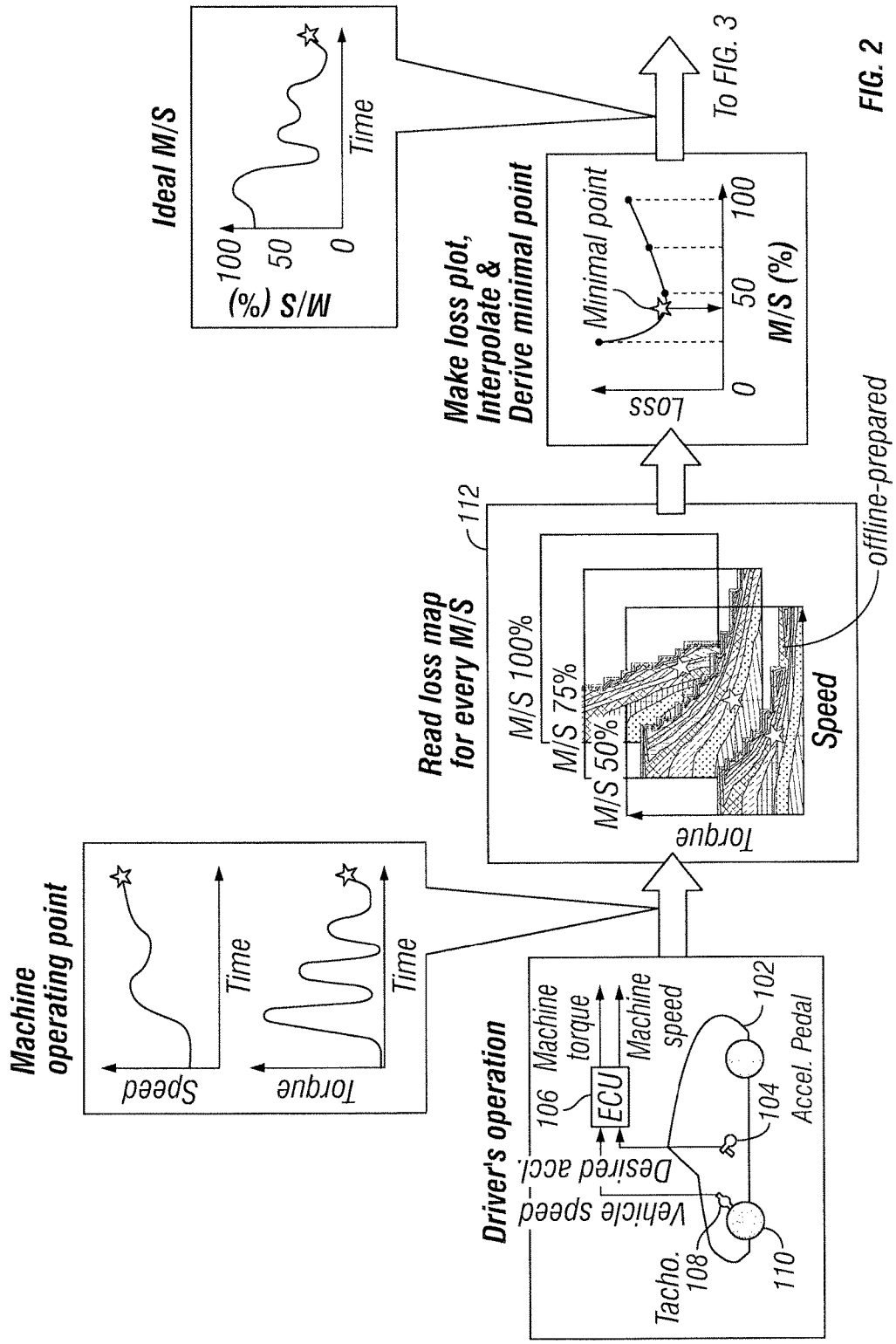
FIGS. 2 through 4 are diagrammatic views illustrating an example of components, including a controller according to the disclosed embodiments, that are employed in a vehicle to control a variable magnetization machine such as that shown in FIG. 1.
Figure 3:
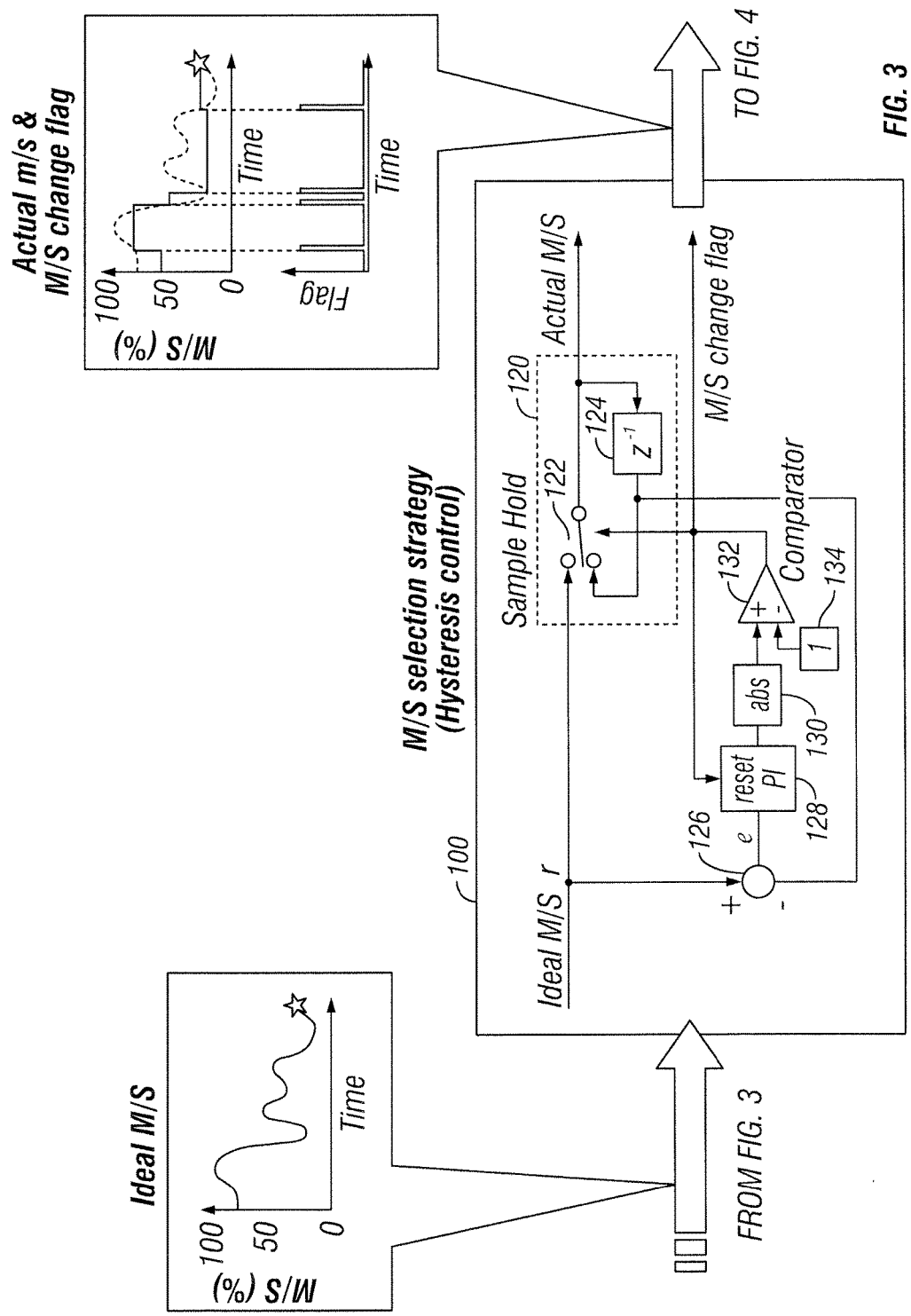
Figure 4:
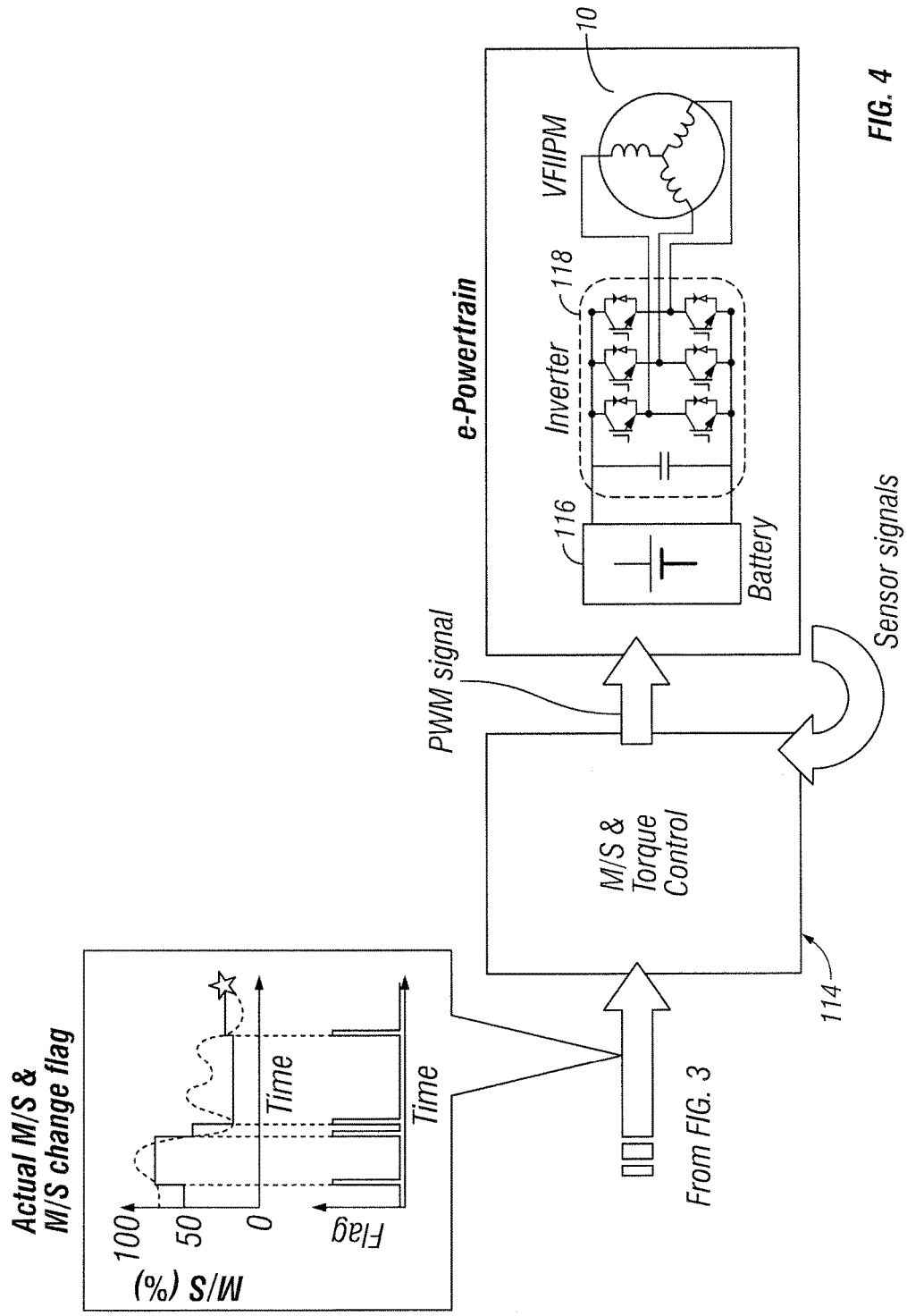

FIGS. 2 through 4 are diagrammatic views illustrating an example of the manner in which a controller 100 (FIG. 3) according to the disclosed embodiments is employed in a vehicle 102 to control the variable magnetization machine 10. The vehicle 102 can be an electric vehicle or HEV such as an automobile, truck, SUV or any other suitable type of vehicle. As understood in the art, when a driver presses the accelerator 104, an acceleration signal is input to a controller 106, such as an electronic control unit (ECU) or any other suitable type of controller. Also, a speed sensor 108, such as a tachometer or any other suitable type of sensor, senses the rotational speed of, for example, a drive wheel 110 of the vehicle 102 and provides a vehicle speed signal to the controller 106.

The controller 106 includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controller 106 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Furthermore, the controller 106 can communicate with the accelerator 104, the speed sensor 108 and the other components in the vehicle 102 discussed herein in any suitable manner as understood in the art. In addition, the components of the controller 106 need not be individual or separate components, and one component or module can perform the operations of multiple components or modules discussed herein. Also, each component can include a microcontroller as discussed above or multiple components can share one or more microcontrollers.

As further shown in FIG. 2, the controller 106 outputs signals to control the speed and the torque of the variable magnetization machine 10 to reach the appropriate machine operating state to achieve the desired vehicle acceleration as understood in the art. For instance, the controller 106 can access an appropriate loss map from among a plurality of previously prepared loss maps that can be stored in a memory 112. Each loss map can indicate respective loss characteristics for a respective magnetization state (M/S) as indicated. The controller 106 can then, for example, generate a loss plot which represents an amount of loss for each respective M/S and derive a minimal loss point as indicated. The controller 106 can therefore output a signal to control the variable magnetization machine 10 to achieve that ideal M/S.

Figure 5:
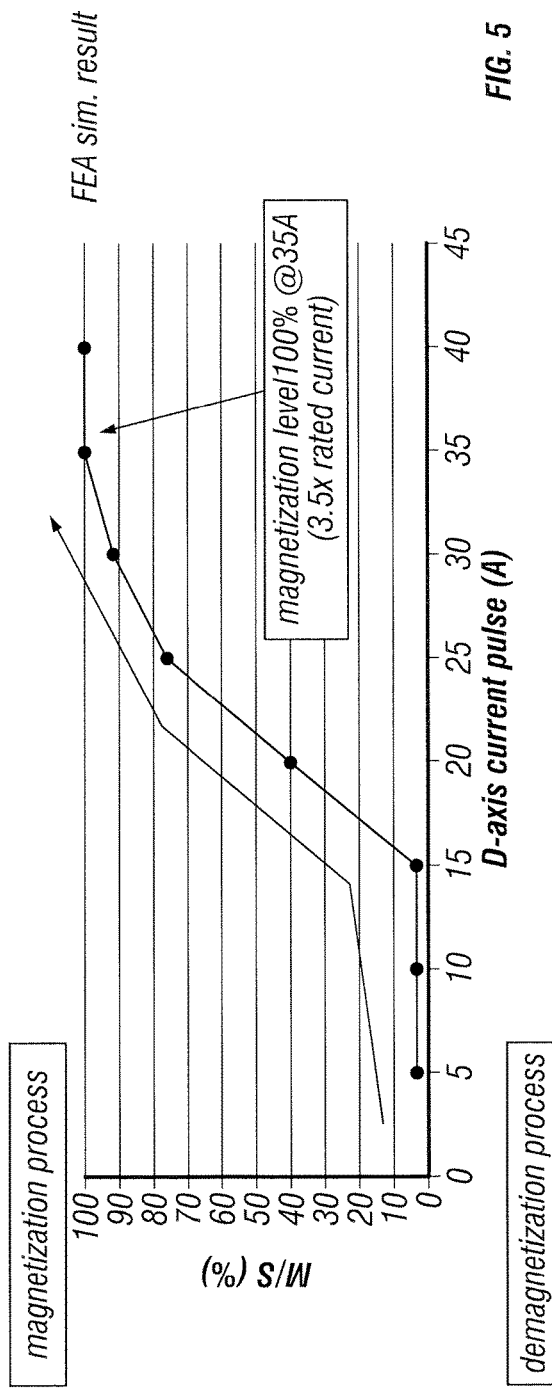
FIGS. 5 and 6 are graphs which illustrate an example of the relationship between the M/S and the d-axis current pulse that are applied to the variable magnetization machine by the configuration shown in FIGS. 2 through 4 during a magnetization process and a demagnetization process.
Figure 6:
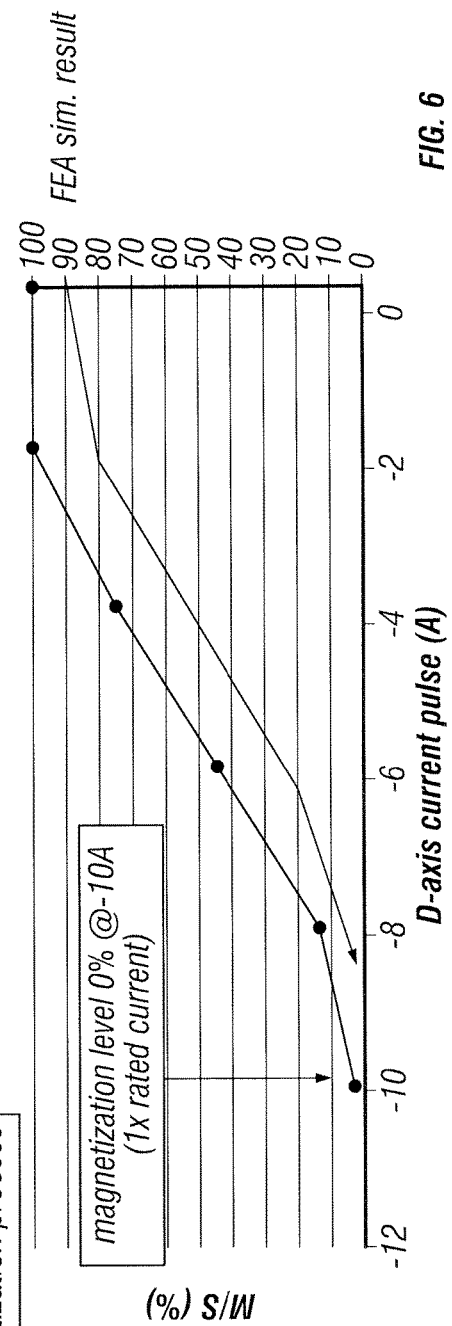

As shown in FIG. 3, the signal represents the ideal M/S that is input to the controller 100 which, as discussed in more detail below, outputs a signal representing the actual M/S and an M/S change flag signal. An M/S and torque controller 114 receives the signal representing the actual M/S and the M/S change flag signal, and outputs a current control signal, such as a pulse width modulated (PWM) signal, to control the variable magnetization machine 10. The features of the M/S and torque controller 114, as well as the features of the e-powertrain including the battery 116, the inverter arrangement 118 and the variable magnetization machine 10, are described in more detail in related International Application PCT/US20131048562 which is referenced above. Furthermore, FIGS. 5 and 6 are graphs which illustrate an example of the relationship between the M/S and the d-axis current pulse that the M/S and torque controller 114, along with the battery 116 and the inverter arrangement 118, applies to the variable magnetization machine 10 during a magnetization process (FIG. 5) and a demagnetization process (FIG. 6).

An example of components of the controller 100 will now be described with regard to FIG. 7. As shown, the controller 100 includes a sample and hold circuit 120 that includes a switch 122 and a z-transform component 124. The controller 100 further includes a subtractor 126, a proportional-integral (PI) compensator 128, an absolute value circuit 130, a comparator 132 and a comparator input component 134.

The ideal M/S signal is input to the switch 122 of the sample and hold circuit 120 and the subtractor 126. The subtractor 126 subtracts a feedback signal from the ideal M/S signal and outputs and error signal to the PI compensator 128. As understood in the art, the PI compensator 128 removes a steady state error from the error signal and provides the error signal with the steady state error removed to the absolute value circuit 130 as a modified error signal. The absolute value circuit 130 outputs an absolute value of the modified error signal to the comparator 132. The comparator 132 also receives an input signal from the comparator input component 134. In this example, the input signal represents a value "1" but can be set to any suitable value to achieve the effects discussed herein.

The comparator 132 provides an output based on the modified error signal and the input signal to control switching of the switch 122 of the sample and hold circuit 120. The comparator 132 also provides the output as a reset signal to the PI compensator 128 as understood in the art. The comparator 132 further provides the output as an M/S change flag signal to the M/S and torque controller 114 discussed above.

As further shown, the z-transform component 124 provides a feedback of the actual M/S signal output by the sample and hold circuit 120 as a second input to the switch 122. The switch 122 outputs either the ideal M/S signal or the feedback signal from the z-transform component 124 as the actual M/S signal based on the state of the output signal provided by the comparator 132. Therefore, the components of the controller 100 discussed above operate as a hysteresis control component that is configured to receive an ideal magnetization state signal, output an actual magnetization state signal based on the ideal magnetization state signal for control of a variable magnetization machine, and modify the actual magnetization state signal in accordance with an error value between the ideal magnetization state signal and the actual magnetization state signal. That is, when the error value results in the comparator 132 outputting a signal having a value that controls the switch 122 to output the modified signal from the z-transform component 124 as the actual M/S signal, the controller 100 in effect modifies the actual M/S signal in accordance with an error value between the ideal magnetization state signal and the actual magnetization state signal. Thus, the sample and hold circuit 120 (sample and hold component) that is configured to output the actual magnetization state signal and to modify the actual magnetization state signal in accordance with the error value. The controller 100 configured to operate as the hysteresis control component is further configured to output the M/S change flag signal as a pulse signal in synchronization with the actual M/S signal such that the variable magnetization machine 10 is further controlled in accordance with this pulse signal.

Figures 7, 8:
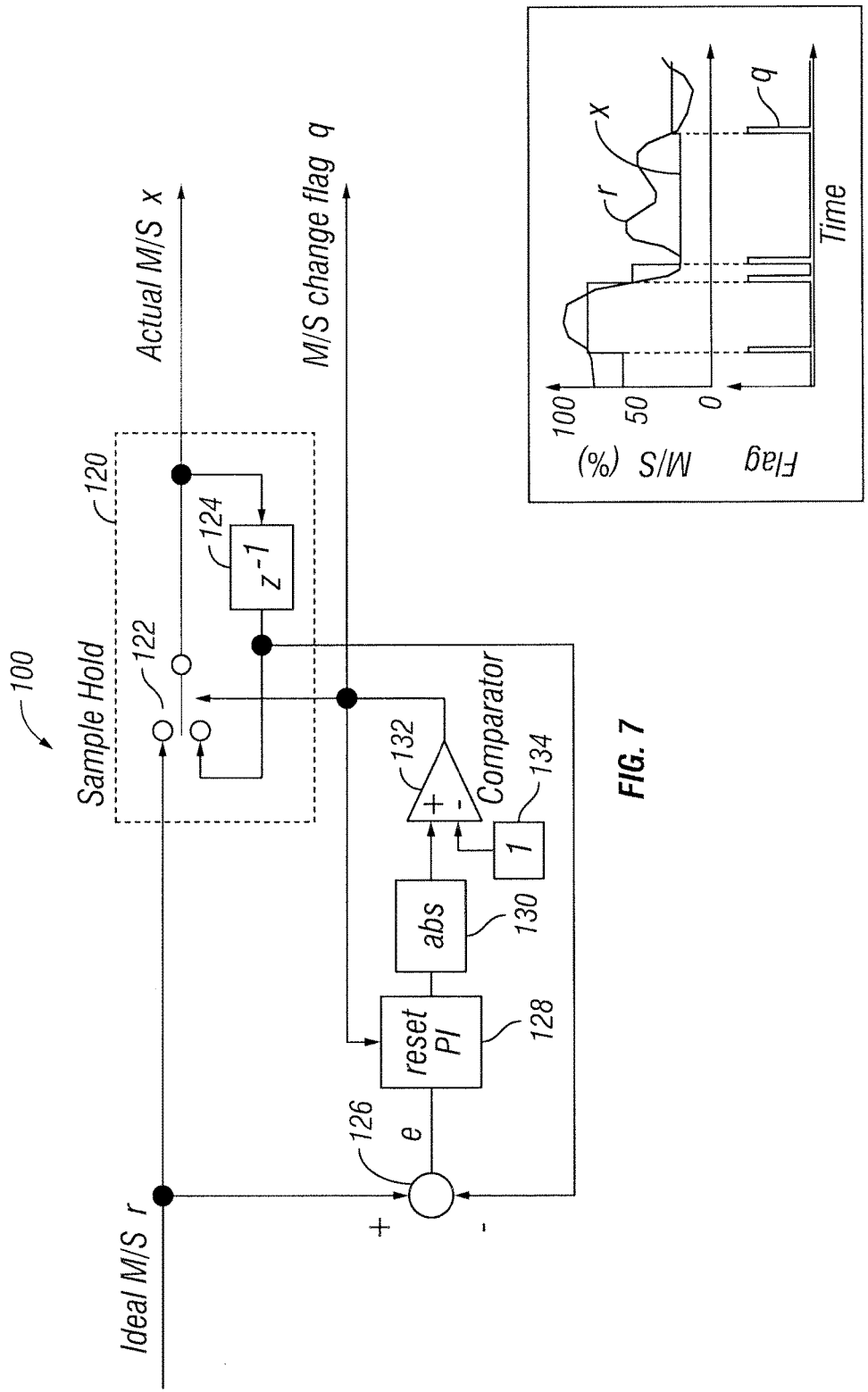
FIG. 7 is a block diagram illustrating an example of components of a controller employed in the configuration shown in FIGS. 2 through 4 according to a disclosed embodiment.
FIG. 8 is a graph illustrating examples of the actual M/S signal and the M/S flag signal output by the controller over time.
Figure 9:
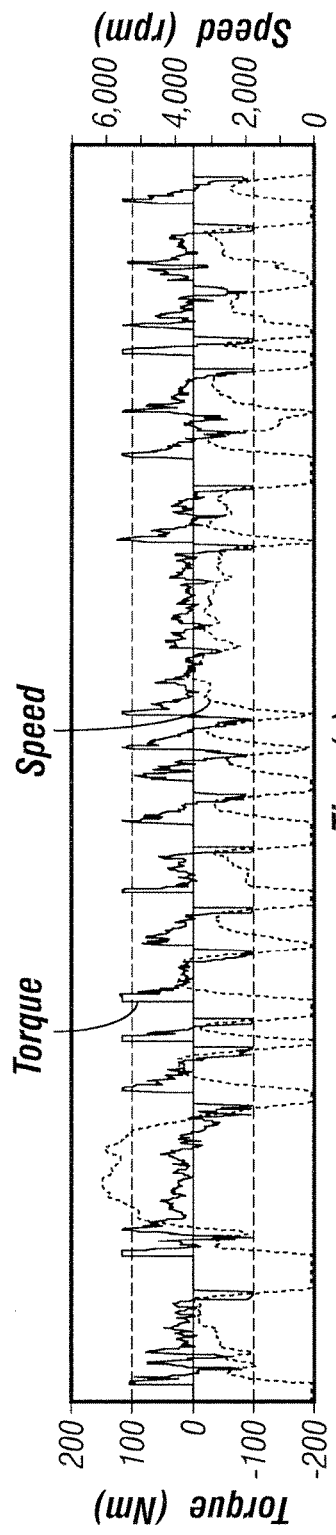
FIG. 9 is a graph illustrating an example of the torque of the variable magnetization machine as controlled based on the actual M/S signal and the M/S change flag signal output as controlled by the controller.
Figure 10:
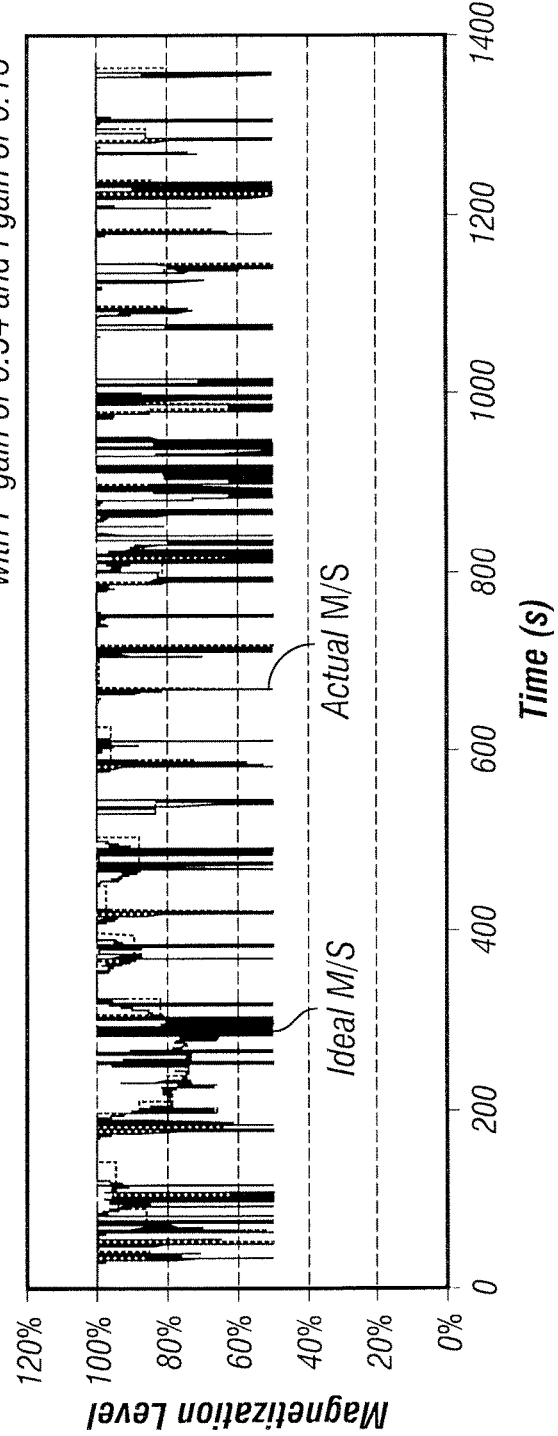
FIG. 10 is a graph illustrating an example of the magnetization of the variable magnetization machine as controlled based on the actual M/S signal and the M/S change flag signal output as controlled by the controller.
Figure 11:
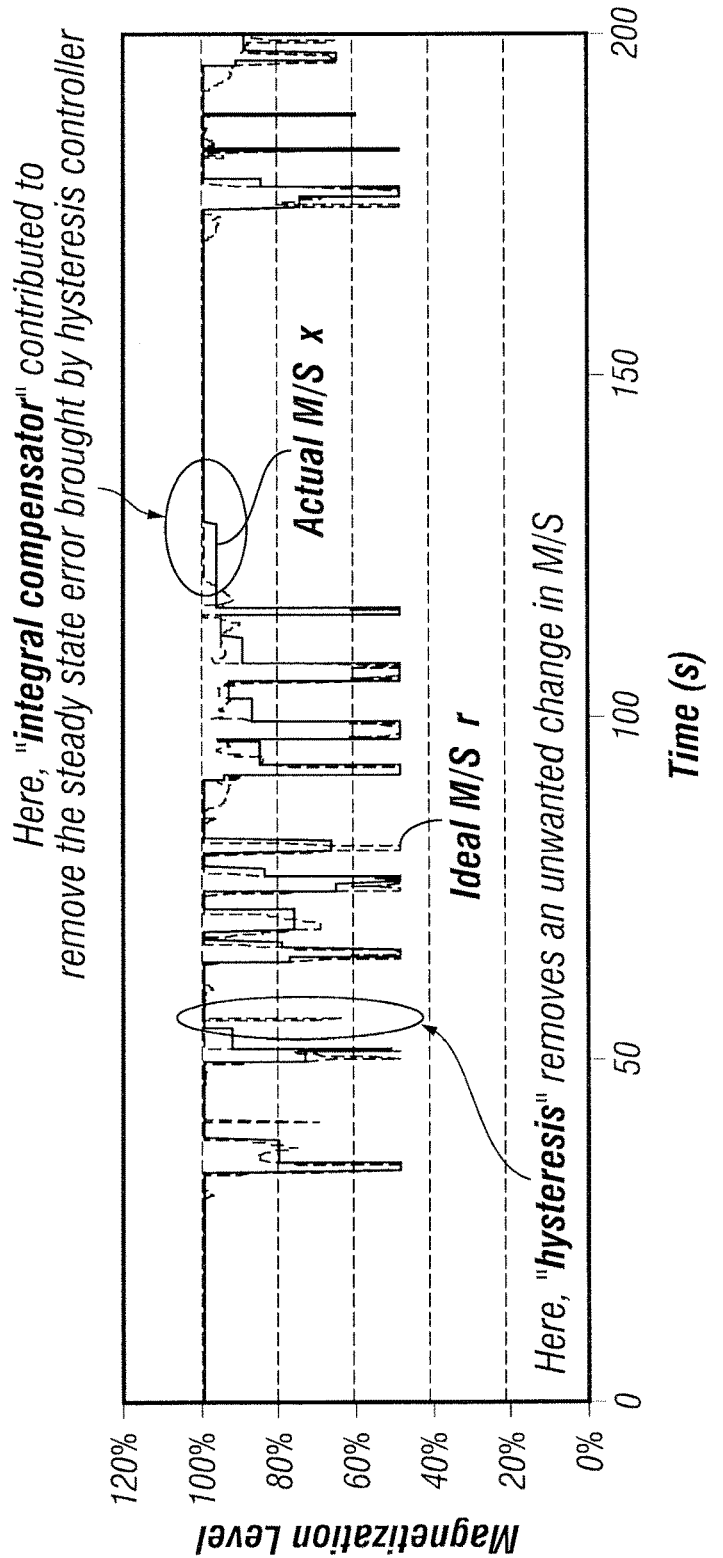
FIG. 11 is a graph illustrating a detailed view of a portion of the graph of FIG. 10.

Examples of the actual M/S signal and the M/S flag signal output by controller 100 over time are shown in the graph of FIG. 8. This graph illustrates the changes that occur to the M/S signal as caused by the switching between the ideal M/S signal and the modified actual M/S signal as the actual M/S signal that is output by the controller 100. As indicated, the hysteresis controller operations performed by the controller 100 reduces the number of changes in the actual M/S signal, while the PI compensator 128 removes the steady state error from the error signal as discussed above. The graph in FIG. 9 illustrates an example of the torque of the variable magnetization machine 10 as controlled by the M/S and torque controller 114 based on the actual M/S signal and the M/S change flag signal output by the controller 100. The graph in FIG. 10 and the detailed view of a portion of the graph of FIG. 10 as shown in FIG. 11 illustrate an example of the magnetization level of the variable magnetization machine 10 as controlled by the M/S and torque controller 114 based on the actual M/S signal and the M/S change flag signal output by the controller 100. As indicated, the count of the changes that occur over the same time period as the conventional controller discussed in the Background section above is reduced to 88 as compared to 437 by the conventional controller, while the driving loss is increased by only 1.1 percent or about 1.1 percent.

Figure 12:
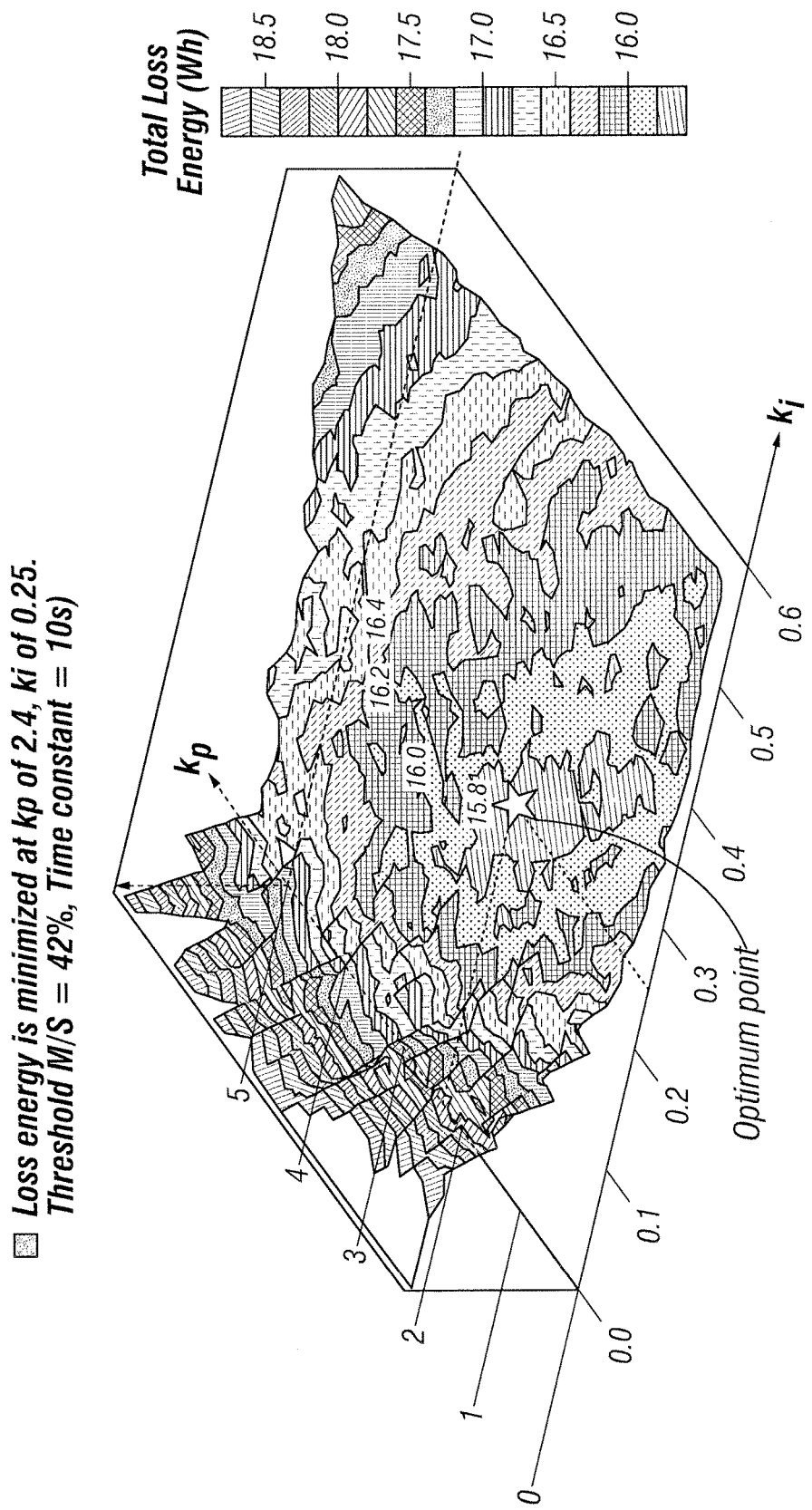
FIG. 12 is a three dimensional graph illustrating exemplary characteristics of loss energy of the variable magnetization machine that can occur under the control of the controller
Figure 13:
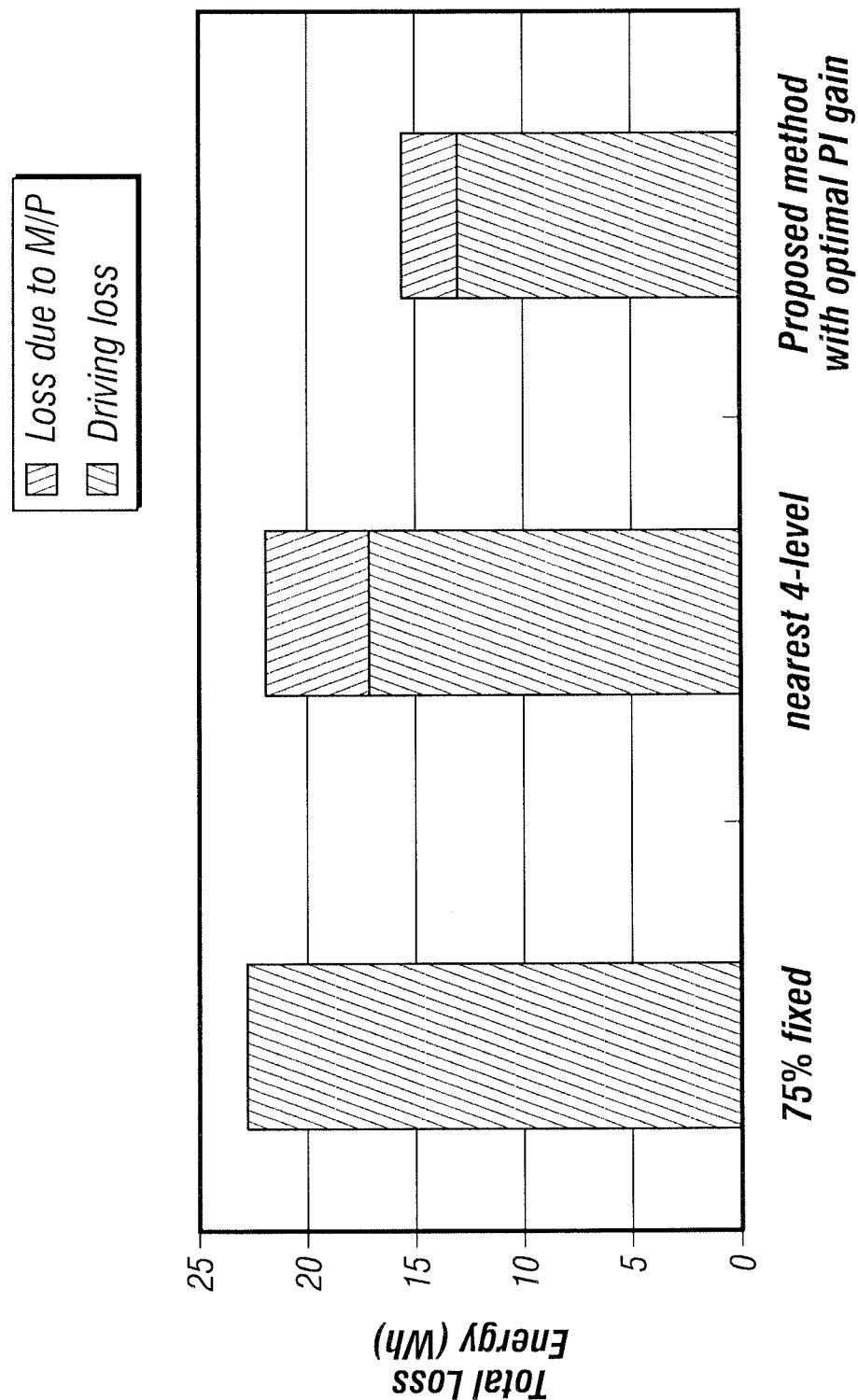
FIG. 13 is a bar graph illustrating examples of the total loss energy and the driving loss that occurs for the variable magnetization machine under the control of the controller.
Figure 14:
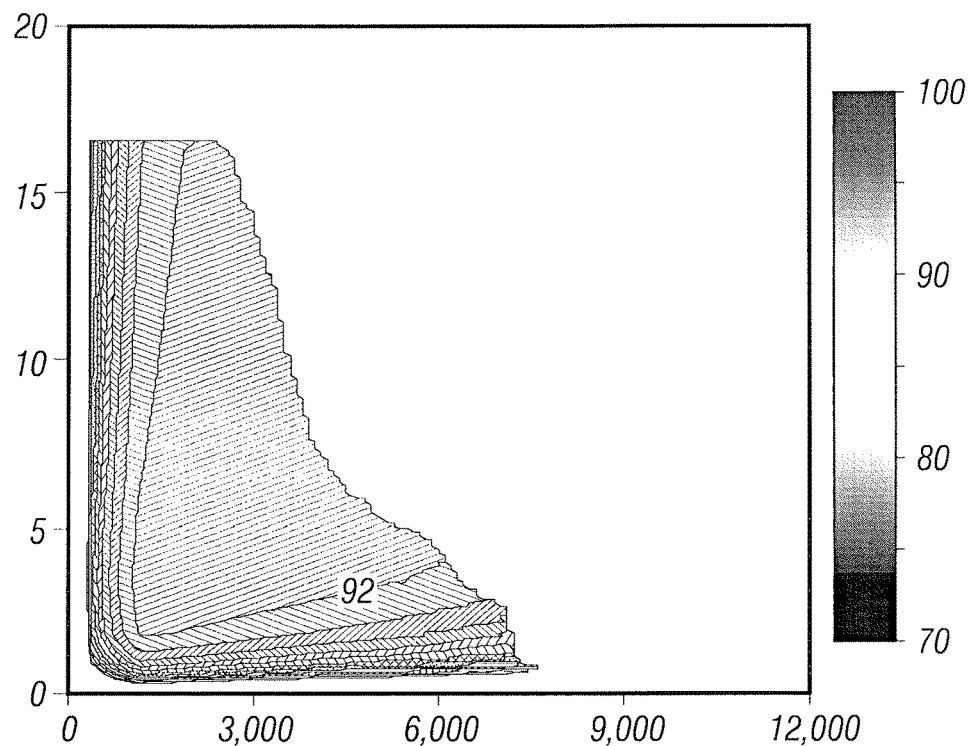
FIGS. 14 through 17 show examples of Eff maps for different configurations of the variable magnetization machine that can be controlled by the controller.
Figure 15:
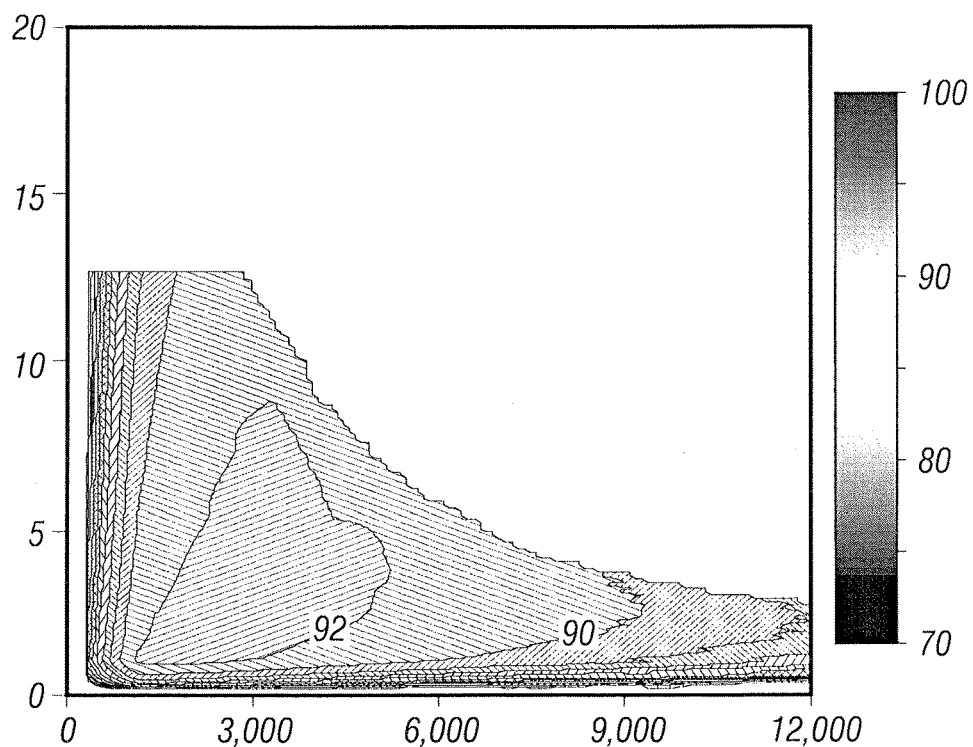
Figure 16:
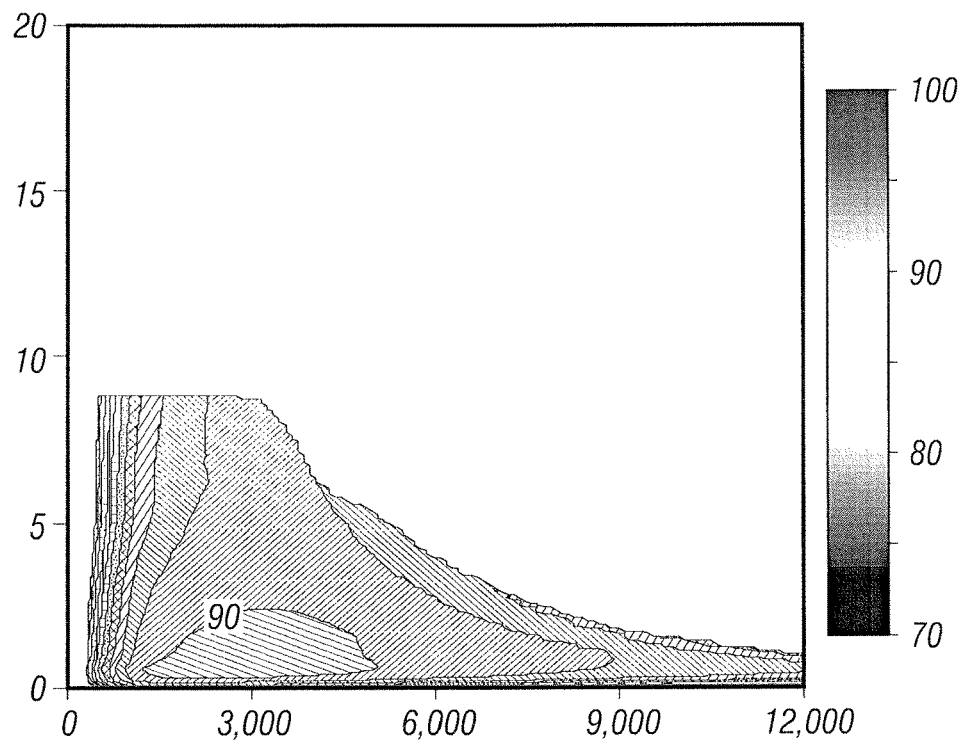
Figure 17:
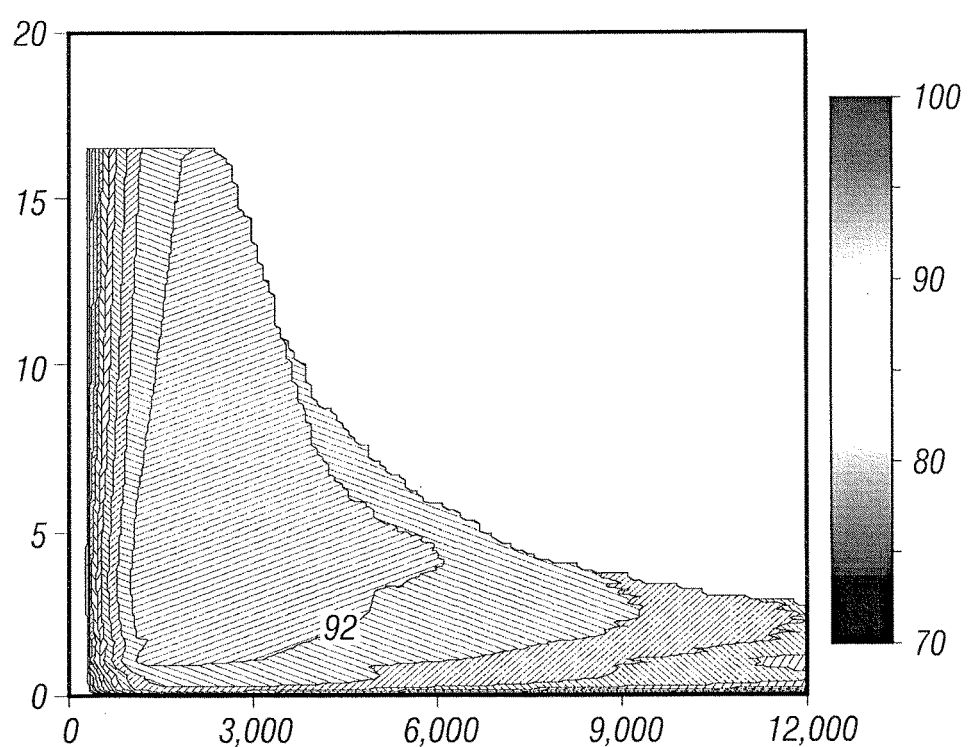

The three dimensional graph shown in FIG. 12 illustrates that under the control of the controller 100, the loss energy is minimized at a proportional gain kp of 2.4 and an integral gain ki of 2.5, with the threshold of the M/S being equal to 42 percent and the time constant being 10 seconds. The bar graph shown in FIG. 13 illustrates examples of the total loss energy and the driving loss that occurs for the variable magnetization machine 10 under the control of the controller 100. As indicated, the count of the changing is reduced to half or about half, while the driving loss is also decreased by 24 percent or about 24 percent. FIGS. 14 through 17 show examples of Eff maps for different configurations of the variable magnetization machine 10 that can be controlled by the controller 100 as discussed herein.

Figure 18:
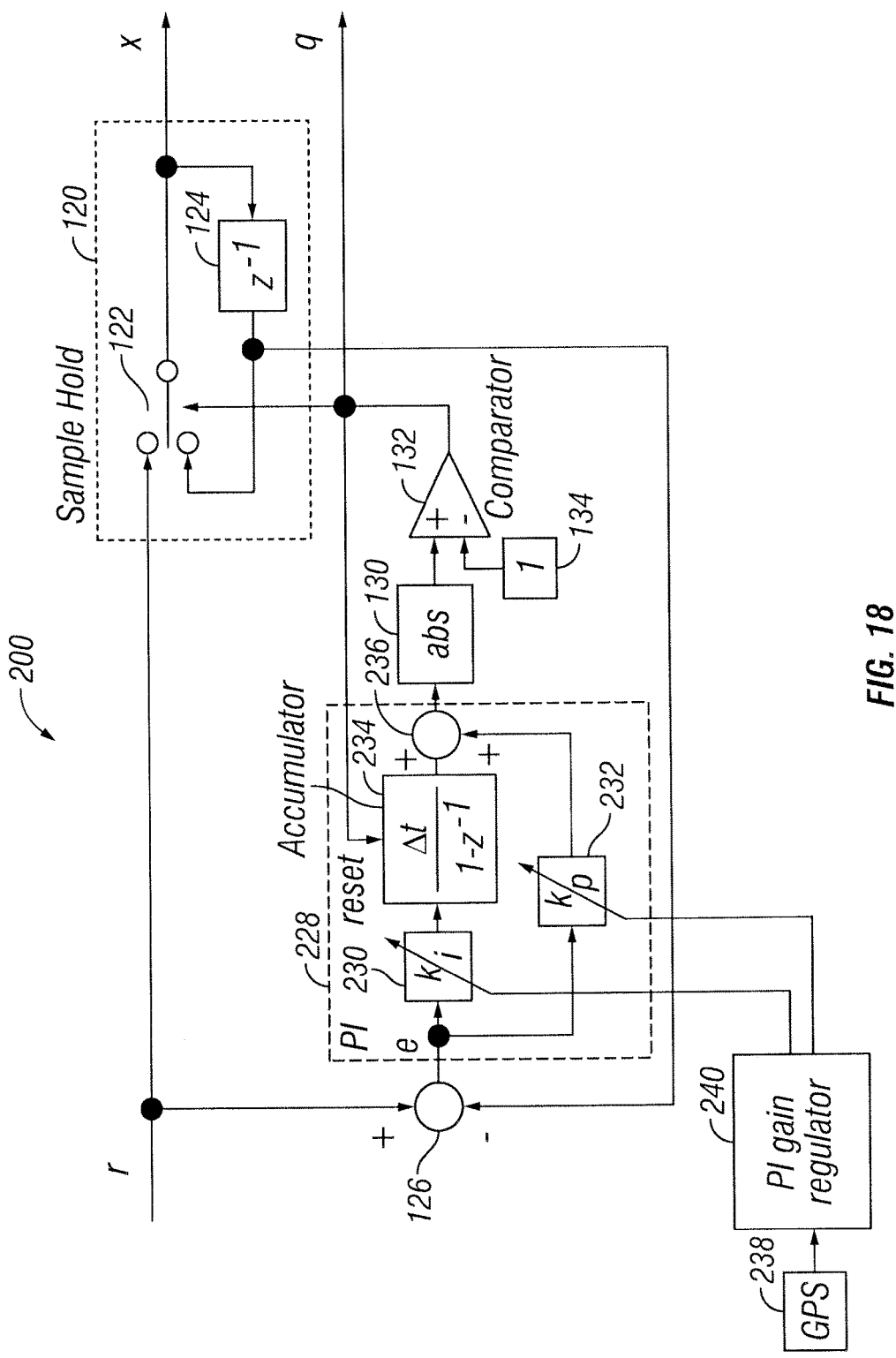
FIGS. 18 through 21 are block diagrams illustrating examples of a controller according to other embodiments.

FIG. 18 is a block diagram illustrating a controller 200 according to another embodiment. As indicated, the controller 200 includes the sample and hold circuit 120 including the switch 122 and the z-transform component 124 as discussed above. The controller 200 further includes the subtractor 126, the absolute value circuit 130, the comparator 132 and the comparator input component 134 as discussed above. In addition, the controller 200 includes a PI compensator 228 that operates in a manner similar to PI compensator 128 as discussed above and includes the components that will now be discussed.

As indicated, the PI compensator 228 in this example can include a gain component 230, a gain component 232, an accumulator 234 and an adder 236. The error signal output from the subtractor 126 is input to the gain components 230 and 232. A location detector 238 (location determining device), such as a global positioning system (GPS) device, can determine the location of the vehicle 102 and output a location signal to a PI gain regulator 240. Thus, the location detector 238 is configured to determine a location of the vehicle 102 based on which the driving pattern of the vehicle 102 can be determined as understood in the art. The PI gain regulator 240 outputs signals to the gain components 230 and 232 to change the gains that the gain components 230 and 232 impose on the error signal. The PI compensator 228 is thus configured to change compensation characteristics in accordance with a driving pattern of the vehicle 102 that includes the variable magnetization machine 10 and the variable magnetization machine controller 200. That is, the PI compensator 228 is configured to remove the steady state error from the error signal based on the compensation characteristics.

Figure 19:
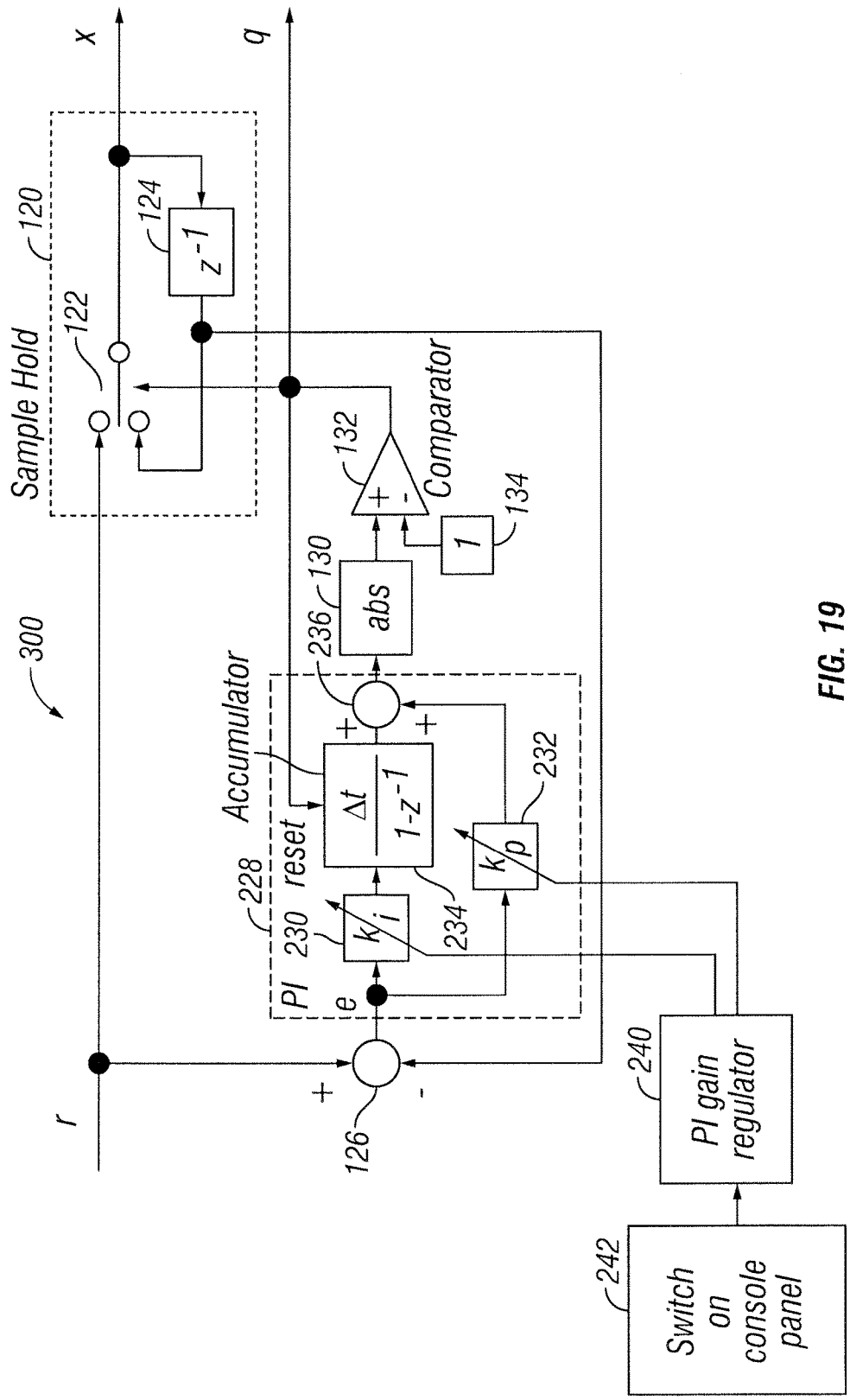

The controller 300 shown in FIG. 19 includes all of the same components as controllers 100 and 200 discussed above. However, instead of receiving signals from a location detector 238, the PI gain regulator 240 receives signals from a driving mode selection device 242 that can be, for example, a switch disposed on a console panel or at any other suitable location within the vehicle 102. The driving mode selection device 242 is configured to enable a driver of the vehicle 102, for example, to select a driving mode of the vehicle 102 based on which the driving pattern of the vehicle is determined as understood in the art. The PI gain regulator 240 outputs signals to the gain components 230 and 232 to change the gains that the gain components 230 and 232 impose on the error signal based on the selected driving mode.

Figure 20:
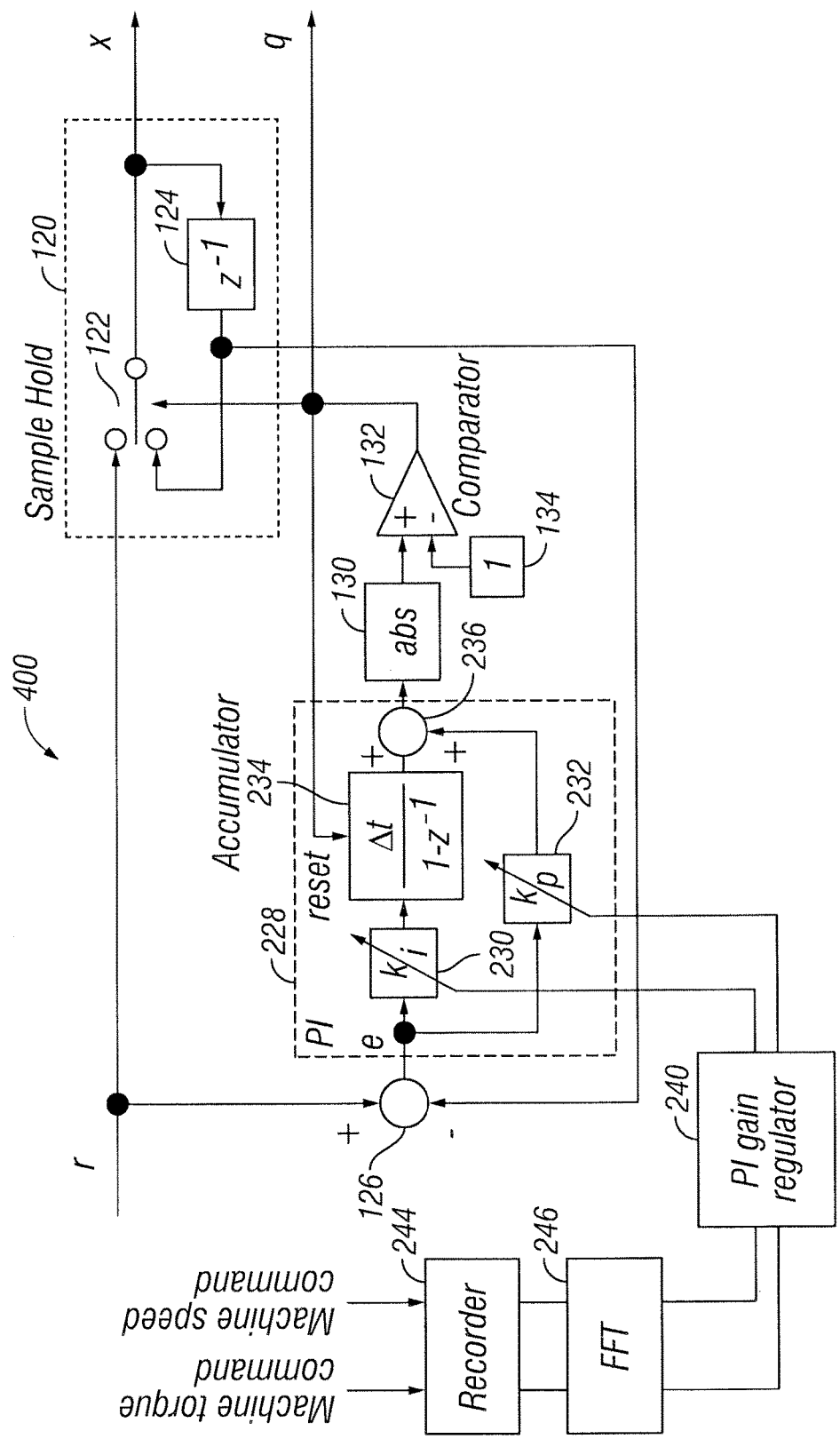

The controller 400 shown in FIG. 20 includes all of the same components as controllers 100 and 200 discussed above. However, instead of receiving signals from a location detector 238 or a drive mode selection device 242, the PI gain regulator 240 receives signals based on driving pattern data that has been stored in, for example, a driving history recordation device 244 such as a memory or other suitable type of storage device. The driving history recordation device 244 is configured to record a driving history of the vehicle 102 over a period of time such the driving pattern of the vehicle 102 is determined based on the driving history as understood in the art. Signals representing the data stored in the driving history recordation device 244 can be provided directly to the PI gain regulator 240. Alternatively, the data stored in the driving history recordation device 244 can be provided to a component 246 that is configured to perform a fast fourier transform process on data representing the driving history before the data is provided to the PI gain regulator 240. The driving mode selection device 242 is configured to enable a driver of the vehicle 102, for example, to select a driving mode of the vehicle 102 based on the stored data representing the driving pattern of the vehicle as understood in the art. The PI gain regulator 240 outputs signals to the gain components 230 and 232 to change the gains that the gain components 230 and 232 impose on the error signal based on driving pattern data.

Figure 21:
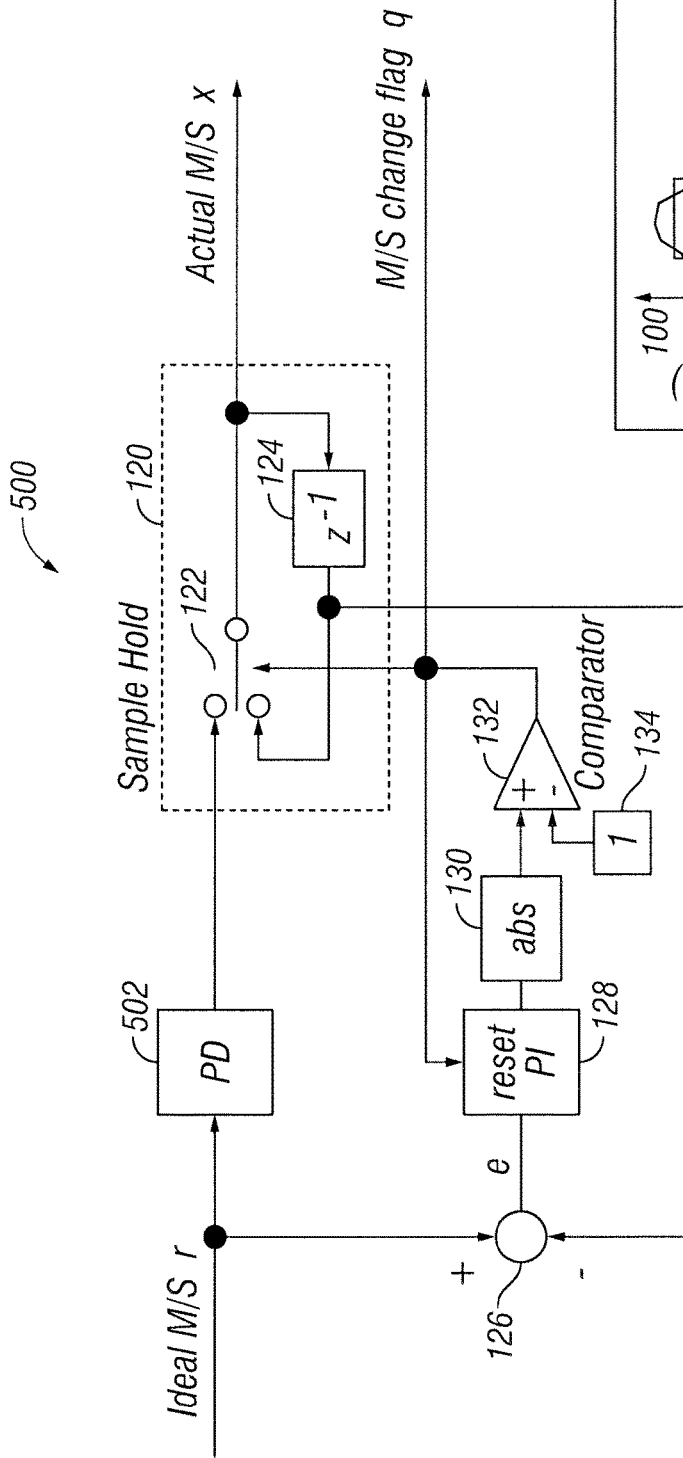
Figure 22:
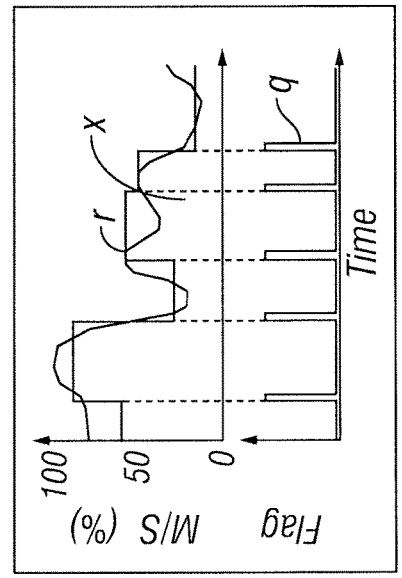
FIG. 22 is a graph illustrating examples of the actual M/S signal and the M/S flag signal output by the controller shown in FIG. 21 over time.

The controller 500 shown in FIG. 21 includes all of the same components as controllers 100 and 200 discussed above. In addition, the controller 500 includes a signal modifying component 502 that is configured to modify the ideal magnetization state signal prior to inputting the ideal magnetization state signal into the sample and hold circuit 120. The signal modifying component 502 can include, for example, a proportional plus derivative compensator that is configured to modify the ideal magnetization state signal as understood in the art to thus regulate the ideal magnetization state signal before the ideal magnetization states signal is input into the sample and hold circuit 120. Examples of the actual M/S signal and the M/S flag signal output by controller 500 over time are shown in the graph of FIG. 22. This graph illustrates the changes that occur to the M/S signal as caused by the switching between the ideal M/S signal and the modified actual M/S signal as the actual M/S signal that is output by the controller 500. Also, the controller 500 can include the features of the controllers 200, 300 and 400 as discussed above. The controllers 200, 300, 400 and 500 can also include the features of each other configured in combination or in the alternative to achieve the effects discussed herein.

The features of the controllers 100, 200, 300, 400 and 500 can be configured as discrete components or can be performed in accordance with, for example, a microprocessor or any other suitable type of signal processing device. Furthermore, the controllers 100, 200, 300, 400 and 500 can include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controllers 100, 200, 300, 400 and 500 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Furthermore, the controllers 100, 200, 300, 400 and 500 can communicate with the other components in the vehicle 102 discussed herein in any suitable manner as understood in the art. In addition, the components of the controllers 100, 200, 300, 400 and 500 need not be individual or separate components, and one component or module can perform the operations of multiple components or modules discussed herein. Also, each component can include a microcontroller as discussed above or multiple components can share one or more microcontrollers.

As can be appreciated from the above, the controllers 100, 200, 300, 400 and 500 each provides a hysteresis component for changing the magnetization level of a variable magnetization machine, such as an electric motor or other type of variable flux machine, that is employed in an electric or hybrid electric vehicle. The operations of the controllers 100, 200, 300, 400 and 500 thus provide an M/S selection method that reduces the number of changes to the actual M/S signal and provides no or essentially no steady state error.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A variable magnetization machine controller comprising:
a hysteresis control component configured to receive an ideal magnetization state signal, output an actual magnetization signal based on the ideal magnetization state signal for control of a variable magnetization machine, and modify the actual magnetization state signal in accordance with an error value between the ideal magnetization state signal and the actual magnetization state signal, the ideal magnetization state signal indicating a magnetization state in which an energy loss is minimal.

2. The variable magnetization machine controller according to claim 1, wherein
the hysteresis control component comprises a proportional-integral compensator that is configured to receive an error signal representing the error value and remove a steady state error from the error signal so that the hysteresis control component modifies the actual magnetization state signal in accordance with the error value from which the steady state error has been removed.

3. The variable magnetization machine controller according to claim 2, wherein
the compensator is configured to change compensation characteristics in accordance with a driving pattern of a vehicle including the variable magnetization machine and the variable magnetization machine controller, the compensator being configured to remove the steady state error signal based on the compensation characteristics.

4. The variable magnetization machine controller according to claim 2, wherein
the hysteresis control component is further configured to output a pulse signal in synchronization with the actual magnetization signal such that the variable magnetization machine is further controlled in accordance with the pulse signal.

5. The variable magnetization machine controller according to claim 3, further comprising
a location determining device configured to determine a location of the vehicle based on which the driving pattern of the vehicle is determined.

6. The variable magnetization machine controller according to claim 3, further comprising:
a driving mode selection device configured to select a driving mode of the vehicle based on which the driving pattern of the vehicle is determined.

7. The variable magnetization machine controller according to claim 3, further comprising:
a driving history recordation device configured to record a driving history of the vehicle over a period of time such the driving pattern of the vehicle is determined based on the driving history.

8. The variable magnetization machine controller according to claim 3, wherein
the hysteresis control component is further configured to output a pulse signal in synchronization with the actual magnetization signal such that the variable magnetization machine is further controlled in accordance with the pulse signal.

9. The variable magnetization machine controller according to claim 5, wherein
the location determining device includes a global positioning system device.

10. The variable magnetization machine controller according to claim 5, wherein
the hysteresis control component is further configured to output a pulse signal in synchronization with the actual magnetization signal such that the variable magnetization machine is further controlled in accordance with the pulse signal.

11. The variable magnetization machine controller according to claim 6, wherein
the hysteresis control component is further configured to output a pulse signal in synchronization with the actual magnetization signal such that the variable magnetization machine is further controlled in accordance with the pulse signal.

12. The variable magnetization machine controller according to claim 7, further comprising:
a component configured to perform a fast fourier transform process on data representing the driving history.

13. The variable magnetization machine controller according to claim 7, wherein
the hysteresis control component is further configured to output a pulse signal in synchronization with the actual magnetization signal such that the variable magnetization machine is further controlled in accordance with the pulse signal.

14. The variable magnetization machine controller according to claim 9, wherein
the hysteresis control component is further configured to output a pulse signal in synchronization with the actual magnetization signal such that the variable magnetization machine is further controlled in accordance with the pulse signal.

15. A variable magnetization machine controller comprising:
a hysteresis control component configured to receive an ideal magnetization state signal, output an actual magnetization signal based on the ideal magnetization state signal for control of a variable magnetization machine, and modify the actual magnetization state signal in accordance with an error value between the ideal magnetization state signal and the actual magnetization state signal; and
a signal modifying component configured to modify the ideal magnetization state signal prior to inputting the ideal magnetization state signal into the sample and hold circuit, the hysteresis control component comprising a sample and hold component that is configured to output the actual magnetization state signal and to modify the actual magnetization state signal in accordance with the error value.

16. The variable magnetization machine controller according to claim 15, wherein the signal modifying component includes a proportional plus derivative compensator configured to modify the ideal magnetization state signal.

17. The variable magnetization machine controller according to claim 15, wherein the hysteresis control component comprises a proportional-integral compensator that is configured to receive an error signal representing the error value and remove a steady state error from the error signal so that the hysteresis control component modifies the actual magnetization state signal in accordance with the error value from which the steady state error has been removed.

18. The variable magnetization machine controller according to claim 15, wherein the hysteresis control component is further configured to output a pulse signal in synchronization with the actual magnetization signal such that the variable magnetization machine is further controlled in accordance with the pulse signal.

19. A variable magnetization machine controller, comprising:

a hysteresis control component configured to receive an ideal magnetization state signal, output an actual magnetization signal based on the ideal magnetization state signal for control of a variable magnetization machine, and modify the actual magnetization state signal in accordance with an error value between the ideal magnetization state signal and the actual magnetization state signal, the hysteresis control component being further configured to output a pulse signal in synchronization with the actual magnetization state signal such that the variable magnetization machine is further controlled in accordance with the pulse signal.

* * * * *